Patented Oct. 12, 1943

2,331,424

UNITED STATES PATENT OFFICE 2,331,424

IODINE COMPOUND FOR ANIMAL FEEDING

Alfred W. Russell, Farmingdale, and Paul John Witte, New York, N. Y., assignors to Tyler Laboratories, Incorporated, Brooklyn, N. Y., a corporation of New York No Drawing. Application September 19, 1940, Serial No. 357,400

5 Claims. (Cl. 99—2)

The present invention relates to improvements in iodine compounds, and more particularly to iodine compounds for addition to feed for animals.

One of the objects of the present invention is to provide a superior iodine compound which is more acceptable to animals as part of their feed than the compounds hitherto available.

Another object of the present invention is to provide a superior iodine compound for animal feeding which is relatively free of objectionable tastes.

A further object of the present invention is to provide a superior iodine compound in which the iodine constituent is so finely divided as to be absorbed by the digestive systems of animals with a maximum of completeness.

Still another object of the present invention is to provide a superior iodine compound suitable for animal feeding and which may be fed to animals without causing appreciable digestive disturbances.

A still further object of the present invention is to provide a superior method whereby a superior iodine compound is produced for animal feeding.

A further object is to provide a superior food-supplement for animals in which iodine is so intimately associated with a calcium constituent as to render the latter more readily absorbable by the animals' digestive systems.

With the above and other objects in view, as will appear to those skilled in the art from the present disclosure, this invention includes all features in the said disclosure which are novel over the prior art and which are not claimed in any separate application.

As will be apparent from the following, the present invention contemplates a compound in which the iodine constituent is absorbed by or adsorbed on one or more other suitable ingredients or carriers, such as bone charcoal or dicalcium phosphate. Preferably, the ingredient or ingredients by which the iodine constituent is absorbed or adsorbed should also have some nutritional or medicinal merit, and the iodine should preferably be in an organic form, for reasons as will herein appear.

By way of example of a mode of carrying out the present invention, a suitable solution containing iodine is prepared and one or more suitable carriers are selected. The iodine solution, preferably in an amount insufficient to create a fluid or semi-fluid of the mixture, is added to the dry or substantially dry carrier. Among the materials suitable as carriers may be mentioned calcium phosphate, charcoal, bran, etc.

Preferably after the iodine solution has been added to the relatively-dry material composed of one or more carriers, it is preferred to grind the entire compound in order to avoid the effects of the agglomeration of the particles or their becoming cemented together.

It is preferred that the iodine solution employed shall have its iodine content in the form of chemically-combined iodine in order to provide iodine in a very fine state of subdivision, possibly bordering on particles of substantially-molecular size. It is also preferred that the iodine contained in the iodine solution referred to be of an organic iodine combination such, for instance, as iodine chemically combined with a protein derivative such as amino-acetic acid which has appreciable nutritional or medicinal value.

As a specific example of one iodine compound of the present invention, the initially-dry constituents may be in the following proportions: 63.4 grams of dicalcium phosphate, 30.5 grams of bone charcoal, and 5.1 grams of sulphur. To this initially-dry or substantially-dry mixture may be added 1.3 c. c. of a glycine-hydro-iodide solution containing about 1 gram of iodine.

The fluid glycine-hydro-iodide above referred to will be immediately so absorbed by the other constituents as not to render the mixture visibly wet. Preferably, all the constituents after mixing as described, may be more intimately mixed by grinding the whole so that the particles will pass through a 100-mesh sieve. The resultant mixture will be a dark grey powder which will not deteriorate with age nor be subjected to harmful freezing, and may be added in recommended quantities to the normal feed of an animal.

Another compound which possesses valuable properties for addition to the diet of an animal, consists of substantially only three active constituents, namely, 64.8% dicalcium phosphate, 32.2% charcoal and substantially 3% glycine-hydro-iodide.

Other carriers for the iodine may be employed provided only that they are of an edible character and will adsorb a suitable iodine solution. By way of example, a mixture containing 10.5% bran, 60% calcium phosphate and 28.4% charcoal may have added to it an iodine solution containing sufficient iodine to supply 1.1% of iodine.

When the iodine solution is added to the carrier or carriers (sometimes herein referred to absorbed though some thereof may be possibly adsorbed and it is to be understood that the use of the term "absorbed" herein is intended to include adsorption.

Should the iodine solution be sufficient in amount to materially wet the carrier, the excess moisture may be removed by gentle heat prior to grinding the whole to secure the desired minuteness of particles.

As before noted, it is preferred that the iodine constituent of the iodine compound of the present invention be in the form of an organic chemical combination. More especially, it is preferred to use an iodine chemically combined with a protein derivative such, for instance, as glycine.

It will be understood that the percentage of iodine included in the compound of the present invention may vary widely to meet various requirements for different animals and also to meet the individual preferences of veterinarians or the like.

It has been ascertained that by combining iodine with an edible calcium salt (with or without other carriers) that the calcium is rendered readily absorbable by the digestive system of an animal than would otherwise be the case. Thus, in addition to supplying an iodine content to the ration, the iodine renders the calcium so readily available to the digestive systems of animals as to cause but little calcium wastage.

The glycine-hydro-iodide (the reaction product of iodine and a protein-derivative) referred to above as a preferred iodine-carrying solution for absorption by one or more carriers, may be conveniently prepared by the process set forth in detail in the co-pending application of Paul J. Witte, Serial No. 308,777, filed December 12, 1939.

By preparing the iodine content of the intended compound in the form of a solution and then adding the same to one or more carriers, the iodine content is so finely divided and well distributed as not to deleteriously affect the taste of animal food to which the compound may be added, and furthermore the iodine is rendered more readily available to the digestive systems of animals for maximum absorption thereby.

When the iodine constituent is in inorganic form such as potassium iodide the major portion of the iodine is eliminated from the animals' systems in about twenty-four hours' time. When, however, the iodine is in organic combination, the iodine is readily absorbed by the animals' systems and causes negligible, if any, digestive disturbance.

When, as is preferred, the iodine is made up in the form of an iodine-glycine compound, not only is the iodine rendered readily available for absorption by the animals' systems, but the glycine constitutes, in itself, a valuable added nutritive element.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. A powder iodine compound for addition to animal feed, comprising: a carrier capable of absorbing the following organic iodine solution; and an organic solution of the chemical reaction product of iodine and a protein derivative in the form of glycine absorbed in the said carrier.

2. A powder iodine compound for addition to animal feed, comprising: calcium phosphate; and a solution of the chemical reaction product of iodine and a protein derivative in the form of glycine absorbed in the said calcium phosphate.

3. A powder iodine compound for addition to animal feed, comprising: calcium phosphate; charcoal; and a solution of the chemical reaction product of iodine and a protein derivative in the form of glycine absorbed in the said calcium phosphate and charcoal constituents.

4. A method of manufacturing a powder iodine compound for addition to animal feed, comprising: selecting a carrier capable of absorbing a solution of the chemical reaction product of iodine and a protein derivative; mixing with the said carrier an aqueous solution of the chemical reaction product of iodine and a protein derivative in the form of glycine and absorbing the said solution in the said carrier; and grinding the resultant mixture.

5. A method of manufacturing a powder iodine compound for addition to animal feed, comprising: absorbing a solution of glycine-hydro-iodide in both charcoal and calcium phosphate; and grinding the resultant compound.

ALFRED W. RUSSELL.
PAUL JOHN WITTE.